US012524279B2

(12) United States Patent
Walshe et al.

(10) Patent No.: US 12,524,279 B2
(45) Date of Patent: Jan. 13, 2026

(54) AUTOMATICALLY PROVISIONING AND MANAGING SECURE DATABASE RESOURCES IN A CLOUD COMPUTING ENVIRONMENT

(71) Applicant: FMR LLC, Boston, MA (US)

(72) Inventors: John Walshe, Franklin, MA (US); Michael McGoldrick, Lusk (IE); Raghavan Madabusi, Chennai (IN); Manoj Kumar, Cary, NC (US); Paul Silveira, Apex, NC (US); Deidre O'Malley, Ferns (IE); Vijay Ganesh Arumugham, Cary, NC (US); Saurabh Singh, Dublin (IE); Oren Kastner, Nashua, NH (US)

(73) Assignee: FMR LLC, Boston, MA (US)

( * ) Notice: Subject to any disclaimer, the term of this patent is extended or adjusted under 35 U.S.C. 154(b) by 518 days.

(21) Appl. No.: 17/843,879

(22) Filed: Jun. 17, 2022

(65) Prior Publication Data

US 2023/0409408 A1 Dec. 21, 2023

(51) Int. Cl.
*G06F 9/50* (2006.01)
*G06F 8/65* (2018.01)
*G06F 9/44* (2018.01)
*G06F 9/4401* (2018.01)
*G06F 9/455* (2018.01)
*G06F 9/48* (2006.01)
*G06F 16/25* (2019.01)
*G06F 16/27* (2019.01)

(52) U.S. Cl.
CPC .............. *G06F 9/5077* (2013.01); *G06F 8/65* (2013.01); *G06F 9/4406* (2013.01); *G06F 9/455* (2013.01);
(Continued)

(58) Field of Classification Search
CPC .. G06F 9/455; G06F 9/45533; G06F 9/45558; G06F 2009/4557; G06F 9/48;
(Continued)

(56) References Cited

U.S. PATENT DOCUMENTS 8,676,753 B2 * 3/2014 Sivasubramanian ........................
G06F 11/3055
707/614
9,021,046 B2 4/2015 Mayo et al.
(Continued)

OTHER PUBLICATIONS

A. Bhattacharjee et al., "CloudCAMP: Automating Cloud Services Deployment & Management," arXiv:1904.02184v2 [cs.SE] Apr. 9, 2019, available at https://arxiv.org/pdf/1904.02184v2.pdf, 12 pages.
(Continued)

*Primary Examiner* — Charles M Swift
(74) *Attorney, Agent, or Firm* — Cesari and McKenna, LLP (57) ABSTRACT

Methods and apparatuses are described for automatically provisioning and managing secure database resources in a cloud computing environment. A server provisions virtual computing resources in the cloud computing environment using resource templates and creates a database instance in each of the virtual computing resources. The server integrates the database instances and the virtual computing resources in the cloud computing environment with an identity authentication service. The server configures the database instances in two or more of the virtual computing resources to synchronize data. The server monitors each of the plurality of virtual computing resources using a monitoring service. The server updates the database instances by detaching a physical disk drive from the database instance, deleting the virtual computing resource that contains the database instance, provisioning a new virtual computing resource, creating a new database instance in the new virtual computing resource, and re-attaching the physical disk drive.

22 Claims, 5 Drawing Sheets

(52) U.S. Cl.
CPC ...... *G06F 9/45533* (2013.01); *G06F 9/45558* (2013.01); *G06F 9/48* (2013.01); *G06F 9/4806* (2013.01); *G06F 9/4843* (2013.01); *G06F 9/485* (2013.01); *G06F 9/4856* (2013.01); *G06F 9/4881* (2013.01); *G06F 9/50* (2013.01); *G06F 9/5061* (2013.01); *G06F 9/5072* (2013.01); *G06F 9/5083* (2013.01); *G06F 16/256* (2019.01); *G06F 16/275* (2019.01); *G06F 2009/4557* (2013.01)

(58) Field of Classification Search
CPC ...... G06F 9/4806; G06F 9/4843; G06F 9/485; G06F 9/4856; G06F 9/4881; G06F 9/50; G06F 9/5061; G06F 9/5072; G06F 9/5077; G06F 9/5083; G06F 16/256; G06F 16/275; G06F 8/65; G06F 9/4406
See application file for complete search history.

(56) References Cited

U.S. PATENT DOCUMENTS

| | | | |
|---|---|---|---|
| 10,002,173 B1* | 6/2018 | Ramachandran | G06F 16/273 |
| 10,554,750 B2 | 2/2020 | Vasyutynskyy | |
| 11,178,252 B1 | 11/2021 | Devta et al. | |
| 11,263,005 B2 | 3/2022 | Kunjuramanpillai | |
| 11,343,142 B1 | 5/2022 | Wang et al. | |
| 11,392,366 B1 | 7/2022 | Wiegley | |
| 2011/0099146 A1* | 4/2011 | McAlister | G06F 11/2028 707/634 |
| 2015/0178109 A1* | 6/2015 | Li | G06F 9/45558 718/1 |
| 2018/0270125 A1* | 9/2018 | Jain | G06F 16/00 |
| 2020/0092222 A1* | 3/2020 | McClenahan | H04L 67/34 |
| 2021/0049035 A1 | 2/2021 | Beyer et al. | |
| 2021/0092105 A1* | 3/2021 | Yu | H04L 67/306 |
| 2021/0224168 A1* | 7/2021 | Agarwal | G06F 11/2025 |
| 2022/0365944 A1* | 11/2022 | Mehlman | G06F 16/273 |

OTHER PUBLICATIONS

S. Madanala, "Integrating Oracle Database with Microsoft Active Directory for Centrally Managed Users," blog post on Tangenz.com, Oct. 7, 2020, available at https://tangenz.com/applying-oracle-database-with-microsoft-active-directory/, 4 pages.

"Overview of Oracle Applications and solutions on Azure," available at https://docs.microsoft.com/en-us/azure/virtual-machines/workloads/oracle/oracle-overview, Aug. 24, 2021, 4 pages.

* cited by examiner

AUTOMATICALLY PROVISIONING AND MANAGING SECURE DATABASE RESOURCES IN A CLOUD COMPUTING ENVIRONMENT

TECHNICAL FIELD

This application relates generally to methods and apparatuses, including computer program products, for automatically provisioning and managing secure database resources in a cloud computing environment.

BACKGROUND

Significant advances in computing and network technology over the last decade have contributed to the rise of cloud computing services and platforms. These cloud computing services enable enterprises to deploy and host their computing systems, applications, and related services (e.g., web servers, database servers, application servers) in a remote, shared, and often virtualized computing environment that does not need to be actively managed by the enterprise. Enterprises can thus take advantage of the immense computing power, memory storage, network bandwidth, and other highly-scalable resources provided by such cloud computing services to provide a more flexible and efficient computing infrastructure for its employees and customers.

As a result, many enterprises have sought to migrate legacy and/or locally-hosted computing systems (such as backend databases) to a cloud-based platform. This endeavor has led to some technical challenges and obstacles. In one example, an enterprise may utilize a specific database platform that it wants to migrate to and/or deploy in a particular cloud computing environment. Often, there are no tools available in the cloud computing platform to accomplish deployment and management of the database in an automated manner—for example, the cloud platform may not support deployment of the database as a managed service, but instead only as an infrastructure as a service (IaaS). Therefore, manual, time-intensive and resource-intensive steps must be taken to both complete the initial provisioning and deployment, and to undertake ongoing maintenance and monitoring of the database platform—which can lead to delays, errors, and lack of repeatability for such actions. In addition, the cloud computing platform may not have the out-of-the-box capability to integrate with other existing enterprise systems (e.g., authentication, data security). Finally, depending upon the requirements of the locally-hosted computing systems that are being migrated, the cloud computing services may not be able to provide a level of service to meet service level agreement (SLA) requirements—for example, some systems may need resiliency options such as high-availability (HA) and failover/switchover protocols.

SUMMARY

Therefore, what is needed are methods and systems for deploying, provisioning, and managing cloud-based database instances automatically, overcoming the lack of existing tools to accomplish such tasks. The techniques described herein advantageously enable a framework of provisioning and rehydrating cloud computing resources through centralized automation pipelines, integration and onboarding of such cloud computing resources to an identity authentication service, and allowing for resiliency, failover, and site swapping to deliver seamless and uninterrupted availability of critical database resources.

The invention, in one aspect, features a system for automatically provisioning and managing secure database resources in a cloud computing environment. The system comprises a server computing device configured to provision a plurality of virtual computing resources in the cloud computing environment using one or more resource templates. The server computing device creates a database instance in each of one or more of the virtual computing resources, including attaching the database instance to a physical disk drive. The server computing device integrates the database instances and the virtual computing resources in the cloud computing environment with an identity authentication service provided by a first computing resource of the server computing device. The server computing device configures the database instances in two or more of the virtual computing resources to synchronize data between the database instances. The server computing device monitors each of the plurality of virtual computing resources using a monitoring service provided by a second computing resource of the server computing device, including determining that one of the virtual computing resources has failed and redirecting network traffic from the failed virtual computing resources to another one of the plurality of virtual computing resources. The server computing device updates one or more of the database instances by detaching the associated physical disk drive from the database instance, deleting the virtual computing resource that contains the database instance, provisioning a new virtual computing resource using a different resource template, creating a new database instance in the new virtual computing resource, and re-attaching the physical disk drive to the new database instance.

The invention, in another aspect, features a computerized method of automatically provisioning and managing secure database resources in a cloud computing environment. A server computing device provisions a plurality of virtual computing resources in the cloud computing environment using one or more resource templates. The server computing device creates a database instance in each of one or more of the virtual computing resources, including attaching the database instance to a physical disk drive. The server computing device integrates the database instances and the virtual computing resources in the cloud computing environment with an identity authentication service provided by a first computing resource of the server computing device. The server computing device configures the database instances in two or more of the virtual computing resources to synchronize data between the database instances. The server computing device monitors each of the plurality of virtual computing resources using a monitoring service provided by a second computing resource of the server computing device, including determining that one of the virtual computing resources has failed and redirecting network traffic from the failed virtual computing resources to another one of the plurality of virtual computing resources. The server computing device updates one or more of the database instances by detaching the associated physical disk drive from the database instance, deleting the virtual computing resource that contains the database instance, provisioning a new virtual computing resource using a different resource template, creating a new database instance in the new virtual computing resource, and re-attaching the physical disk drive to the new database instance.

Any of the above aspects can include one or more of the following features. In some embodiments, the one or more resource templates comprise an operating system image file. In some embodiments, the new virtual computing resource that is provisioned when updating one or more of the database instances comprises an operating system image file for a different operating system version. In some embodiments, the new database instance in the new virtual computing resource comprises a database instance for a different version of the database.

In some embodiments, integrating the database instances and the virtual computing resources in the cloud computing environment with an identity authentication service comprises: establishing a connection between the virtual computing resources in the cloud computing environment and the first computing resource of the server computing device; and coupling the database instances and the virtual computing resources to the identity authentication service such that authentication of requests to access the database instances and the virtual computing resources is performed by the identity authentication service. In some embodiments, configuring the database instances in two or more of the virtual computing resources to synchronize data between the database instances comprises periodically replicating data from the database instance in a first virtual computing resource to the database instance in a second virtual computing resource. In some embodiments, the second virtual computing resource is located at a different physical location than the first virtual computing resource. In some embodiments, the database instance in the first virtual computing resource is an active database and the database instance in the second virtual computing resource is a standby database. In some embodiments, the database instance in the first virtual computing resource is a read-and-write database and the database instance in the second virtual computing resource is a read-only database.

In some embodiments, monitoring each of the plurality of virtual computing resources using a monitoring service provided by a second remote computing resource comprises: establishing a connection between the virtual computing resources in the cloud computing environment and the second computing resource of the server computing device; and receiving, by the second computing resource of the server computing device, one or more alert messages from one or more of the virtual computing resources via the established connection when a failure event occurs at the one or more virtual computing resources. In some embodiments, the second computing resource of the server computing device determines another virtual computing resource that is available and redirects network traffic intended for the failed virtual computing resources to the another virtual computing resource.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
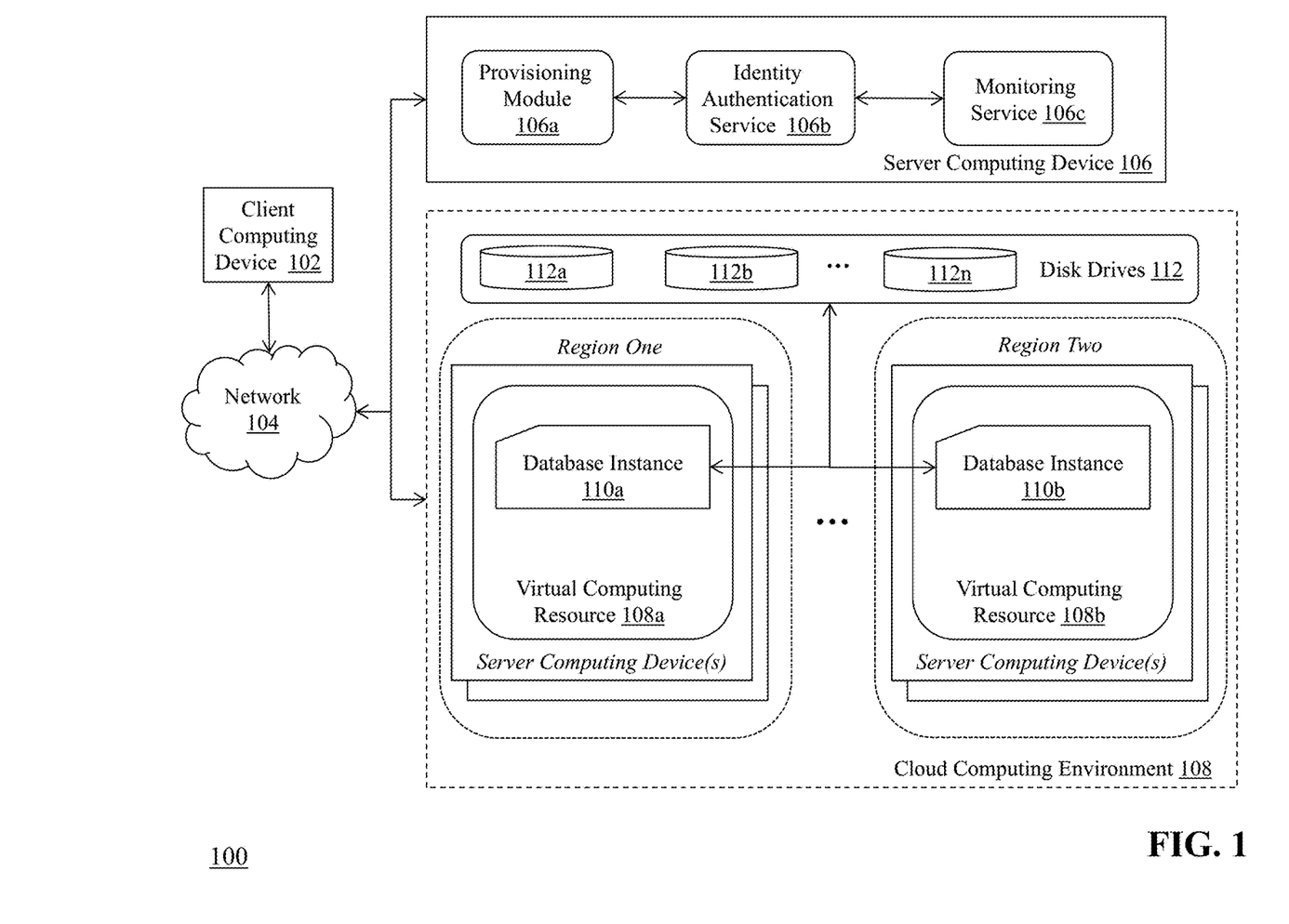
FIG. 1 is a block diagram of a system for provisioning and managing secure database resources in a cloud computing environment.

FIG. 1 is a block diagram of a system 100 for provisioning, migrating, and managing secure database resources in a cloud computing environment. The system 100 includes a client computing device 102 that is coupled via communications network 104 to server computing device 106 and cloud computing environment 108. The server computing device 106 includes a provisioning module 106a, an identity authentication service 106b, and a monitoring service 106c. The cloud computing environment 108 includes a plurality of virtual computing resources 108a-108b executing on one or more server computing devices in the cloud computing environment 108. Each virtual computing resource 108a-108b includes a database instance 110a-110b. The cloud computing environment further includes one or more physical disk drives 112a-112b.

The client computing device 102 connects to the communications network 104 in order to communicate with the server computing device 106 and the cloud computing environment 108 to provide input and receive output relating to the process of provisioning, migrating, and managing secure database resources in a cloud computing environment as described herein. The client computing device 102 can be coupled to a display device (not shown). For example, client computing device 102 can provide a detailed graphical user interface (GUI) via the display device that presents output resulting from the methods and systems described herein, where the GUI is utilized by an operator to review and monitor database status information provided by the server computing device 102 and/or the cloud computing environment 108.

Exemplary client devices 102 include but are not limited to desktop computers, laptop computers, tablets, mobile devices, smartphones, and internet appliances. It should be appreciated that other types of computing devices that are capable of connecting to the components of the system 100 can be used without departing from the scope of invention. Although FIG. 1 depicts a single client computing device 102, it should be appreciated that the system 100 can include any number of client devices.

The communication network 104 enables the other components of the system 100 to communicate with each other in order to perform the process of provisioning, migrating, and managing secure database resources in a cloud computing environment as described herein. The network 104 may be a local network, such as a LAN, or a wide area network, such as the Internet and/or a cellular network. In some embodiments, the network 104 is comprised of several discrete networks and/or sub-networks (e.g., cellular to Internet) that enable the components of the system 100 to communicate with each other.

The server computing device 106 is a combination of hardware, including one or more special-purpose processors and one or more physical memory modules, and specialized software modules—such as modules 106a-106c—that are executed by a processor of the server computing device 106, to receive data from other components of the system 100, transmit data to other components of the system 100, and perform functions for provisioning, migrating, and managing secure database resources in a cloud computing environment as described herein. In some embodiments, the modules 106a-106c are specialized sets of computer software instructions programmed onto a dedicated processor in the server computing device 106 and can include specifically-designated memory locations and/or registers for executing the specialized computer software instructions. Further explanation of the specific processing performed by the modules 106a-106c will be provided below.

The cloud computing environment 108 is a combination of hardware, including one or more special-purpose processors and one or more physical memory modules, and specialized software—such as virtual computing resources 108a-108b and database instances 110a-110b— that are executed by a processor of one or more server computing devices in the cloud computing environment 108, to receive data from other components of the system 100, transmit data to other components of the system 100, and perform functions for provisioning, migrating, and managing secure database resources in a cloud computing environment s as described herein. In some embodiments, the virtual computing resources 108a-108b comprise a software module such as a container that includes a plurality of files and configuration information (i.e., software code, environment variables, libraries, other dependencies, and the like) and one or more database instances 110a-110b (i.e., data files and/or a local database). The cloud computing environment 108 can be configured to execute many virtual computing resources 108a-108b, in isolation from each other, that access a single operating system (OS) kernel. In some embodiments, the server cloud computing environment 108 executes each virtual computing resource in a separate OS process, and constrains each container's access to physical resources (e.g., CPU, memory) of the corresponding server computing device so that a single virtual computing resource does not utilize all of the available physical resources. Upon execution, the server computing device in the cloud computing environment 108 executes application code stored in the virtual computing resource 108a-108b, which in turn accesses the database instance 110a-110b stored in the resource, for delivery, configuration, monitoring, presentation, and/or manipulation of the data contained in the database instance 110a-110b. In one embodiment, the cloud computing environment 108 is deployed using a commercially-available cloud computing platform. As shown in FIG. 1, the resources of the cloud computing environment 108 can be distributed into a plurality of regions which can be defined according to certain geographic and/or technical performance requirements. Each region can comprise one or more datacenters connected via a regional network that meets specific low-latency requirements. Inside each region, the cloud computing environment 108 can be partitioned into one or more availability zones (AZ), which are physically separate locations used to achieve tolerance to, e.g., hardware failures, software failures, disruption in connectivity, unexpected events/disasters, and the like. Typically, the availability zones are connected using a high-performance network (e.g., round trip latency of less than 2 ms). It should be appreciated that other types of computing resource distribution and configuration in a cloud environment can be used within the scope of the technology described herein.

The database instances 110a-110b are resident in a corresponding virtual computing resource 108a-108b and comprise an application and/or a memory location for data storage, that is used in conjunction with the process of provisioning, migrating, and managing secure database resources in a cloud computing environment as described herein described herein. Generally, the database instances 110a-110b are configured to receive, generate, store, and provide specific segments of data in response to application requests received from external computing devices and/or other computing devices in the cloud computing environment 108. In one embodiment, the database instances 110a-110b comprise instances of a commercially-available cloud database that store data for use by software applications that access the cloud computing environment 108.

The cloud computing environment 108 also comprises a plurality of disk drives 112a-112n that are coupled to the database instances 110a-110b of the virtual computing resources 108a-108b. The disk drives 112a-112n comprise physical disk drives (e.g., hard disk drives (HDD) and/or solid-state drives (SSD)) that are used by the virtual computing resources 108a-108b to store data elements associated with the database instances 110a-110b. In the example of a cloud computing environment, these disk drives 112a-112n can be managed/shared disks used by a plurality of different resources or computing devices. Typically, a database instance 110a-110b is attached to a particular disk drive 112a (e.g., when the instance 110a-110b is initialized) and is detached from the disk drive when the database instance is removed, updated, re-initialized, or rehydrated.

Figure 2:
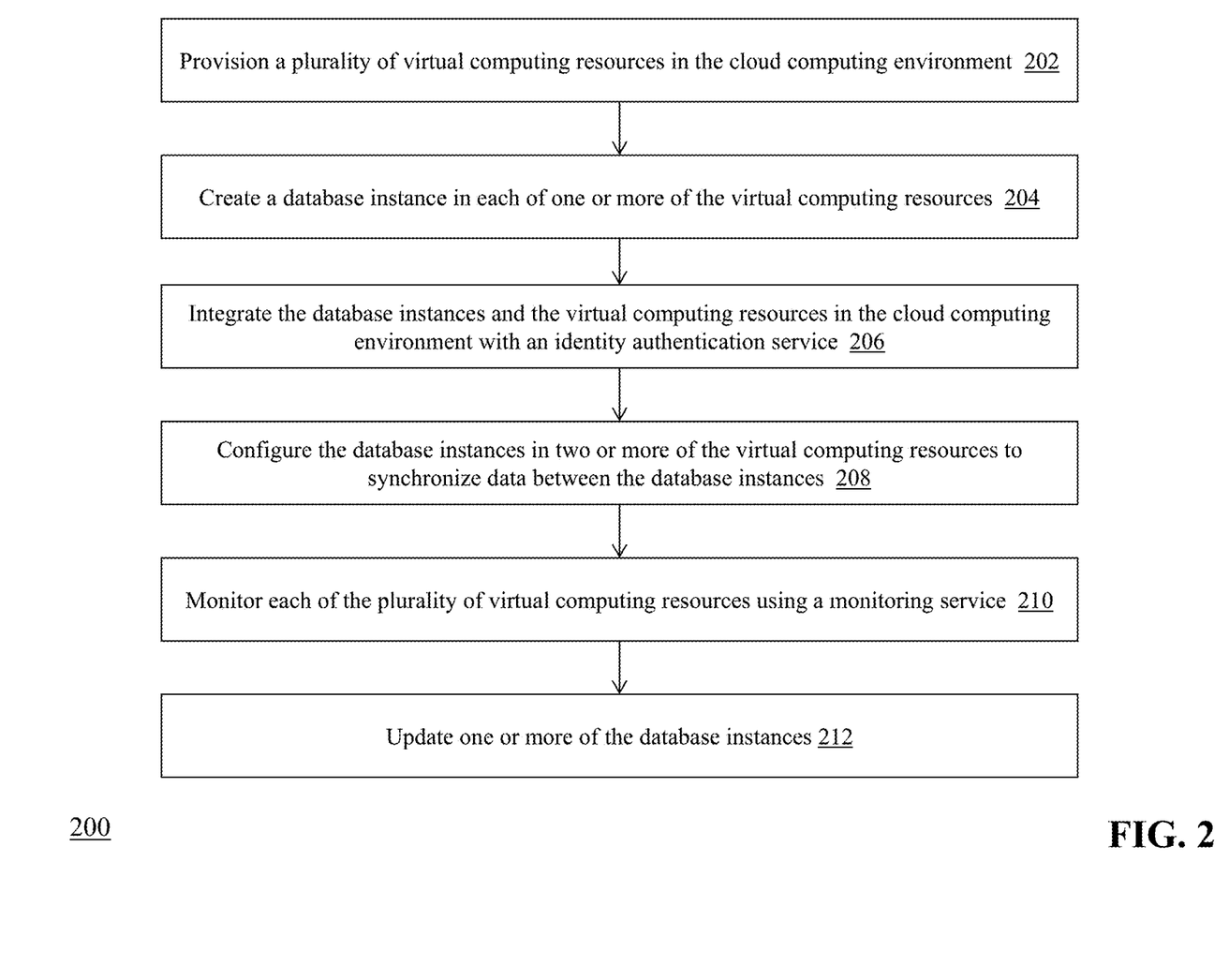
FIG. 2 is a flow diagram of a computerized method of provisioning and managing secure database resources in a cloud computing environment.

The system 100 of FIG. 1 can advantageously implement a number of automated workflows and processes to provision and manage database resources in a cloud computing environment, instead of relying on manually-invoked jobs and user-based monitoring and intervention to dynamically allocate the database resources within the cloud environment. FIG. 2 is a flow diagram of a computerized method 200 of provisioning and managing secure database resources in a cloud computing environment, using the system 100 of FIG. 1.

The provisioning module 106a of server computing device 106 provisions (step 202) a plurality of virtual computing resources (e.g., resources 110a-110b) in the cloud computing environment 108. An exemplary virtual computing resource can be a virtual machine provisioned in the cloud environment. In one embodiment, a user at client computing device 102 establishes a connection via network 104 to the provisioning module 106a. The provisioning module 106a determines a role of the user at client computing device 102 (e.g., using authentication credentials and/or a user profile provided by the client computing device) and enables user access to development software features (e.g., code files, binaries, libraries, etc.) that will be deployed in the provisioned virtual computing resources 110a-110b. For example, the user at client computing device 102 can use DevOps automation tools such as Jenkins™ (available at www.jenkins.io) and/or UrbanCode Deploy™ (uDeploy) (available at www.urbancode.com/product/deploy) to build, test, and deploy software applications to the cloud environment 108. Once the software application to be deployed is identified, the provisioning module 106a establishes a communication session with one or more server computing devices in the cloud environment 108, determines a virtual computing resource template to be used in provisioning the virtual computing resource 110a-110b, and provisions a new virtual computing resource 110a-110b in the cloud environment 108. The template enables the provisioning of a virtual computing resource and automatic deployment of multiple services (and their dependencies) for a software application. The template can be used each time the software application is deployed in the cloud environment 108. In some embodiments, the resource template is determined by the provisioning module 106a based upon the type of software application that is being deployed and/or the dependencies or other features that it requires. For example, the software application may need to be deployed using certain operating system versions, APIs, dependencies, libraries, and the like. The template can be preconfigured in the cloud environment 108 to provide specific computing resources, memory allocations, deployment instructions, configuration settings, and so forth. The provisioning module 106a can provision the virtual computing resource using the template in conjunction with one or more application images retrieved from, e.g., a local or remote image repository.

Once the virtual computing resource(s) are provisioned, the provisioning module 106a creates (step 204) a database instance 110a-110b in each of the one or more virtual computing resources 108a-108b. In some embodiments, the provisioning module 106a connects to each of the virtual computing resources 108a-108b and creates a database instance using, e.g., a database image retrieved from a local or remote image repository. For example, the provisioning module 106a can retrieve a database image and deploy the database image into the virtual computing resource. The database image can be a default database image used in the cloud environment 108 or a customized database image (either newly created for use in the cloud environment 108, uploaded from the server computing device 106, or selected from a network repository). In one example, the database image can be a database-specific Linux™ image that corresponds to a particular database version. In another example, the database image can be a non-database specific Linux image and/or a custom image.

As part of creating the database instances, the provisioning module 106a attaches one or more storage disks (e.g., disk drives 112a-112n) to each of the database instances 110a-110b for use as physical storage locations for the database instances. During database instance creation, the provisioning module 106a can connect to the disk drives 112a-112n, determine characteristics like storage capacity, latency, bandwidth, availability, and the like for each disk drive, and select one or more disk drives/locations to attach to each database instance 110a-110b.

After the database instances 110a-110b have been created and attached to storage, the provisioning module 106a integrates (step 206) the database instances 110a-110b and corresponding virtual computing resources 108a-108b in the cloud environment 108 with the identity authentication service 106b of server computing device 106. For example, in some infrastructures, the server computing device 106 can maintain an on-premises user access management module such as identity authentication service 106b. In order to ensure seamlessness and uniformity of access control from on-premises to cloud, it is desirable to synchronize user accounts between the local identity service 106b and the cloud environment 108. This also enables users to access database instances 110a-110b and virtual computing resources 108a-108b according to the specific permissions/ roles assigned to them in the on-premises system. In some embodiments, the identity authentication service 106b is configured to connect to the cloud environment 108 and establish a link relationship between a user of the identity authentication service 106b and a corresponding cloud representation of the user (that is maintained by the cloud service provider). The configuration of the cloud environment 108 enables each of the database instances 110a-110b and virtual computing resources 108a-108b to access the user access information when responding to requests (e.g., data read/write/update requests, application execution, etc.) that require access to the database instances, as received from end users. Then, when access changes are made to the users in the identity authentication service 106b, those changes are synchronized automatically to the cloud environment 108.

The provisioning module 106a also configures (step 208) the database instances 110a-110b in two or more of the virtual computing resources 108a-108b to synchronize data between the database instances. As can be appreciated, a benefit of implementing resources and services in a cloud computing environment is the ability to create redundancy and failover infrastructures so that critical enterprise data and applications do not experience any interruptions in service. During initial deployment and/or during subsequent updates, the provisioning module 106a can configure two or more database instances according to any of a number of different high availability patterns so that data remains consistent and able to be access across different virtual computing resources and/or availability zones in the cloud computing environment 108. The high availability patterns (active-standby and active-read replica) are described below in FIGS. 3 and 4 respectively.

Figure 3:
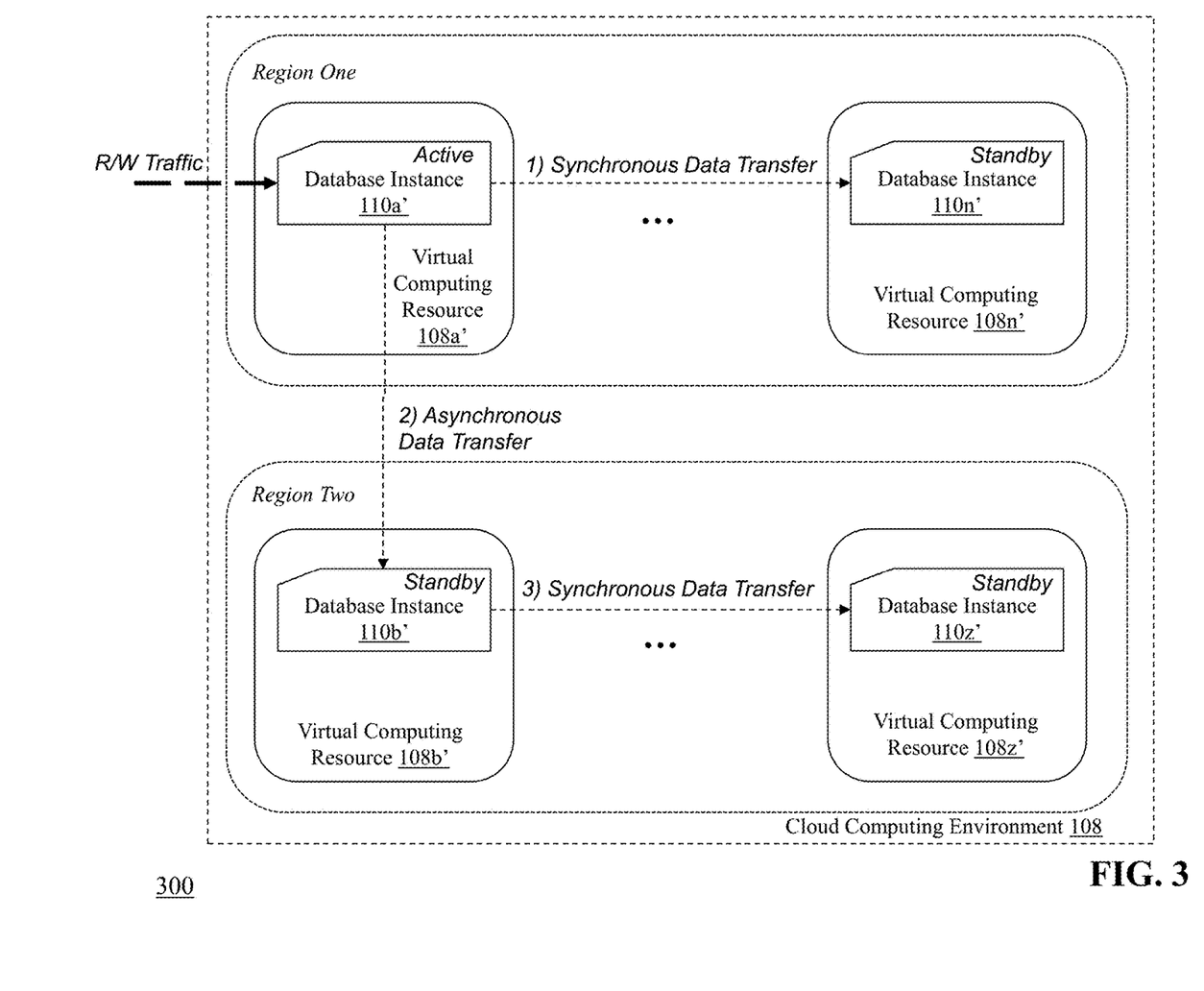
FIG. 3 is a detailed flow diagram of an active-standby high availability database configuration.

FIG. 3 is a detailed flow diagram of an active-standby high availability database configuration 300, using the system 100 of FIG. 1. As shown in FIG. 3, the provisioning module 106a first enables synchronous data transfer between database instance 110a' in virtual computing resource 108a' and database instance 110n' in virtual computing resource 108n'. The database instances 110a' and 110n' are in the same region (Region One) of the cloud computing environment 108. In this example, database instance 110a' is the active database instance that handles incoming read/write requests while database instance 110n' is a standby database instance that maintains synchronized data with instance 110a' and can be made available in the event that instance 110a' fails. In addition, the provisioning module 106a enables asynchronous data transfer between database instance 110a' and database instance 110b' on virtual computing resource 108b' in a different region (Region Two) of the cloud computing environment 108. The database instance 110b' is also a standby database instance that maintains a copy of the data from database instance 110a' and can be made available in the event that the entire region (Region One) of the cloud environment 108 goes offline. Lastly, the provisioning module 106a enables synchronous data transfer between database instance 110b' and database instance 110z' on virtual computing resource 108z' in the same region (Region Two) as instance 110b'. This redundancy allows for continued availability of the data in the event that both Region One and virtual computing resource 108b' go offline. As can be appreciated, the data transfer configuration shown in FIG. 3 can be replicated across any number of different database instances, virtual computing resources, and/or regions in the cloud computing environment 108 to provide for uninterrupted availability of data.

Figure 4:
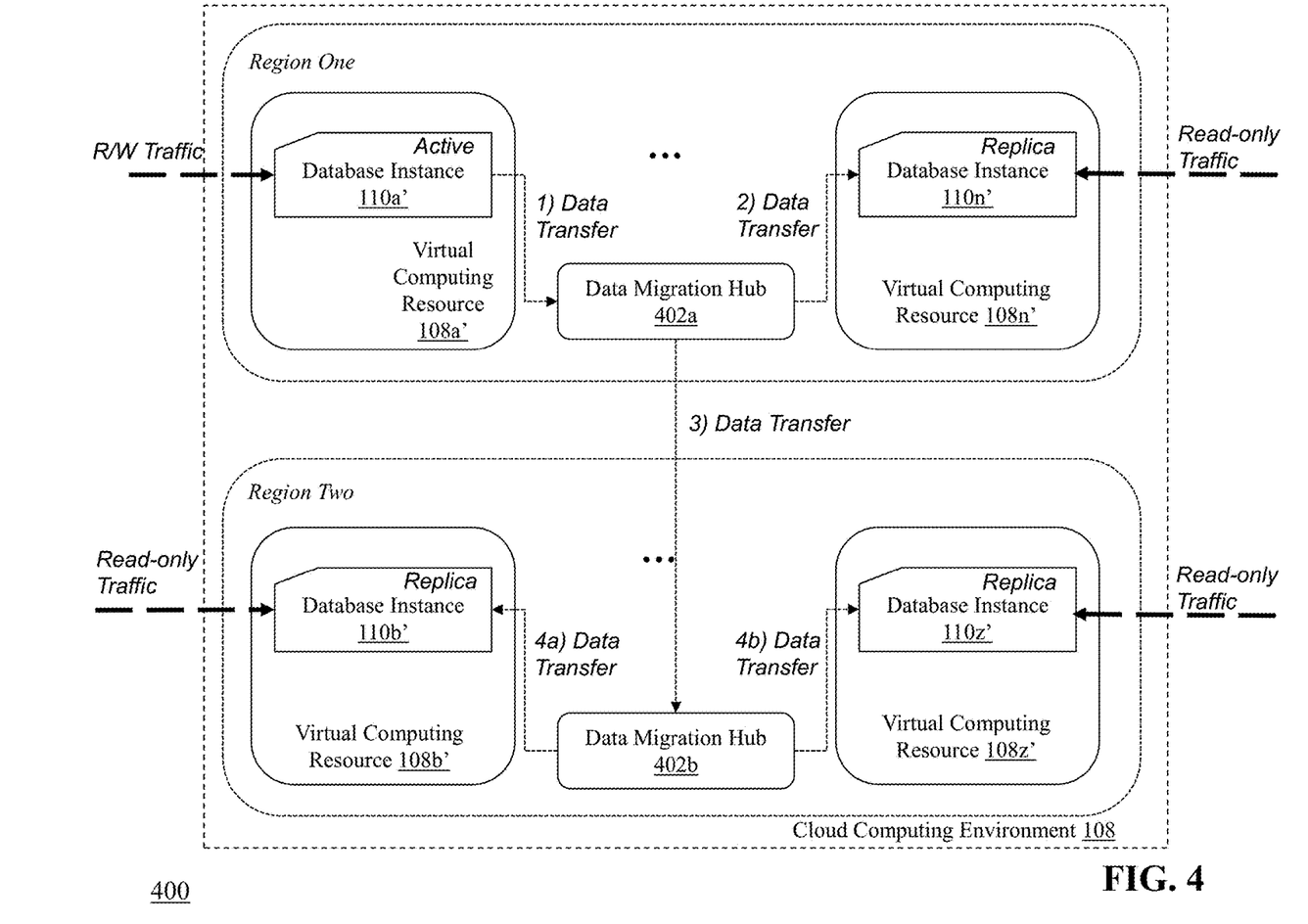
FIG. 4 is a detailed flow diagram of an active-read replica high availability database configuration.

FIG. 4 is a detailed flow diagram of an active-read replica high availability database configuration 400, using the system 100 of FIG. 1. As shown in FIG. 4, the provisioning module 106a establishes a connection between the active database instance 110a' and a data migration hub 402a in Region One to provide for transfer of data from the active instance 110a' to the data migration hub 402a. In some embodiments, the active database instance does not directly transfer data to the data migration hub but instead provides instructions to the data migration hub 402a for transfer of data to one or more of the replica database instances 110n', 110b' or 110z'. The data migration hub 402a establishes a connection to replica database instance 110n' and coordinates transfer of data from database instance 110a' to instance 110n'. The replica database instance 110n' is configured as a read-only replica, such that the instance can receive read-only traffic (e.g., requests for data) from other computing systems and/or end user devices. Similarly, replica database instances 110b' and 110z' in Region Two are configured as read-only replicas, each capable of receiving read-only traffic. The data migration hub 402a in Region One establishes a connection to data migration hub 402b in Region Two, and coordinates transfer of data from database instance 110a' (and/or data migration hub 402a) to replica database instances 110b' and 110z'.

As can be appreciated, the high availability patterns described in FIGS. 3 and 4 provide several technical advantages to the overall system 100. Once a high availability pattern is set up, the monitoring service 106c of system 100 monitors (step 210 of FIG. 2) each of the plurality of virtual computing resources 108a-108b and database instances 110a-110b. For example, the monitoring service 106c can actively track characteristics of the various database instances and virtual computing resources in the cloud computing environment 108, such as network connectivity, bandwidth, processing overhead, usage, online/offline status, and the like. Upon detecting an undesirable or adverse condition of one or more of the resources 108a-108b and/or instances 110a-110b, the monitoring service 106c can redirect end user traffic from one instance 110a to another instance 110b, one resource 108a to another resource 108b, and/or from one region to another region in order to maintain continuity of data availability and system functionality. In some embodiments, the monitoring service 106c can additionally transmit alert messages received from one or more of the virtual computing resources 108a-108b via the established connection when a failure event occurs at the one or more virtual computing resources 108a-108b. The alert message can be transmitted to, e.g., an end user device like client computing device 102 so that system administrators and other personnel can be informed of the service interruption. Alert messages can also be generated and transmitted by the monitoring service 106c in the event that failures or errors are detected at one or more database instances 110a-110b.

Figure 5:
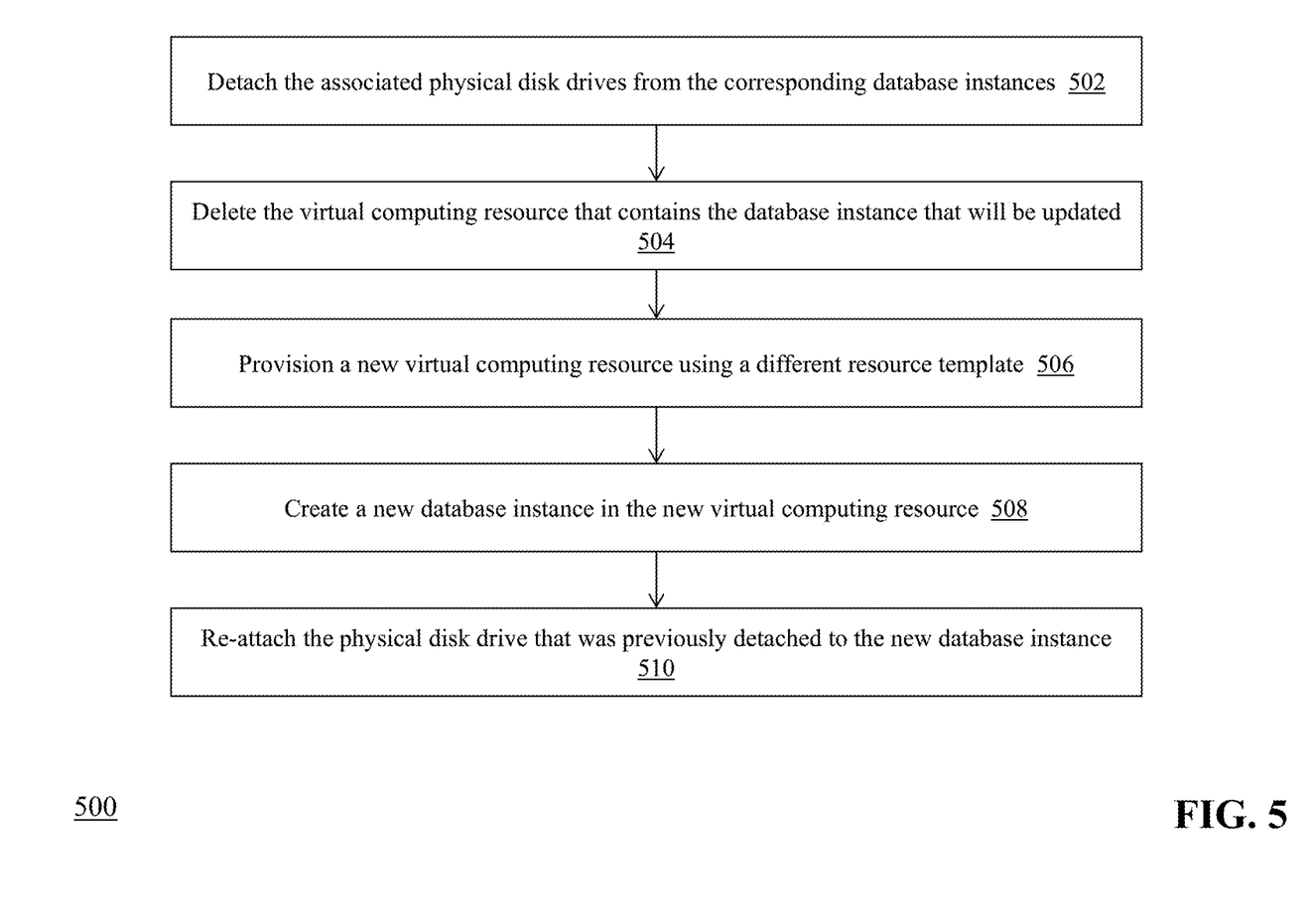
FIG. 5 is a flow diagram of a computerized method of updating a database instance in the cloud computing environment via rehydration.

In addition to the above features, the systems and methods described herein provide for seamless updating of virtual computing resources 108a-108b and/or database instances 110a-110b through a process of rehydration. As can be appreciated, currently-deployed virtual computing resources or database instances may require periodic or emergency software image updates (e.g., when a new database version or operating system version is released). The provisioning module 106a can be configured to initiate a rehydration process to update (step 212 of FIG. 2) virtual computing resources and database instances in the cloud environment. FIG. 5 is a flow diagram of a computerized method 500 of updating a database instance in the cloud computing environment via rehydration, using the system 100 of FIG. 1. As shown in FIG. 5, the provisioning module 106a detects that one or more of the database instances 110a-110b need to be updated. For example, when a new version of the database is released, the provisioning module 106c can be configured to determine that the current version of the database instances is out of date (e.g., by comparing a build number, version number, or other similar indicia). In some embodiments, the provisioning module 106c can determine that an updated software image containing the new version of the database is ready to be deployed in the cloud computing environment 108. To begin the rehydration process, the provisioning module 106c detaches (step 502) the associated physical disk drives 112a-112n from the corresponding database instances 110a-110b. Next, the provisioning module 106c deletes (step 504) the virtual computing resource (e.g., resource 108a) that contains the database instance (e.g., instance 110a) that will be updated.

The provisioning module 106c then provisions (step 506) a new virtual computing resource using, e.g., a different resource template than the template that was originally used to create the virtual computing resource 108a. For example, the provisioning module 106c can deploy the virtual computing resource using an updated software image file that was created to utilize the new version of the database. After the new virtual computing resource is created, the provisioning module 106c creates (step 508) a new database instance in the new virtual computing resource. Finally, the provisioning module 106c re-attaches (step 510) the physical disk drive 112a-112n (that was previously detached in step 512) to the new database instance.

As can be appreciated, the system 100 can implement any or all of the techniques described herein using an automated, script-based approach. For example, the provisioning module 106a can be configured to store one or more scripts that comprise a series of instructions to automatically carry out the required steps for the functions described in FIGS. 2-5. For example, a user at client computing device 102 can connect to the server computing device 106 and initiate execution of one or more scripts to create virtual computing resources and database instances, configure the high availability patterns described herein according to specified requirements, enable the synchronization of data across regions, resources and instances, integrate the cloud computing environment with the identity authentication service, and perform rehydration of resources and/or instances in the cloud environment in order to update relevant software. In this way, the methods and systems advantageously provide for the automated provisioning and management of secure database instances in a cloud computing environment to overcome the lack of existing tools to accomplish such deployment.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for automatically provisioning and managing secure database resources in a cloud computing environment, the system comprising a server computing device configured to:

provision a plurality of virtual computing resources in the cloud computing environment using one or more resource templates, including provisioning a first virtual computing resource and a second virtual computing resource in a first availability zone of the cloud computing environment and provisioning a third virtual computing resource and a fourth virtual computing resource in a second availability zone of the cloud computing environment;

create a database instance in each of the virtual computing resources, including attaching each of the database instances to a physical disk drive;

integrate the database instances and the virtual computing resources in the cloud computing environment with an identity authentication service provided by a first computing resource of the server computing device, including:

establishing a connection between the virtual computing resources in the cloud computing environment and the first computing resource of the server computing device, linking each of a plurality of users of the identity authentication service to corresponding user representations in the cloud computing environment that are maintained by a cloud service provider, authenticating database access requests received by the database instances and the virtual computing resources from end user devices based upon the user representations in the cloud computing environment, and when access changes are made to users of the identity authentication service, automatically synchronizing the access changes to the corresponding user representations in the cloud computing environment;

configure the database instances in the virtual computing resources to synchronize data between the database instances, including:

establishing synchronous data transfer from the database instance in the first virtual computing resource to the database instance in the second virtual computing resource, establishing synchronous data transfer from the database instance in the third virtual computing resource to the database instance in the fourth virtual computing resource, and establishing asynchronous data transfer from the database instance in the first virtual computing resource to the database instance in the third virtual computing resource;

monitor each of the plurality of virtual computing resources using a monitoring service provided by a second computing resource of the server computing device, including determining that one of the virtual computing resources has failed and redirecting network traffic from the failed virtual computing resources to another one of the plurality of virtual computing resources; and update one or more of the database instances by detaching the associated physical disk drive from the database instance, deleting the virtual computing resource that contains the database instance, provisioning a new virtual computing resource using a different resource template, creating a new database instance in the new virtual computing resource, and re-attaching the physical disk drive to the new database instance.

2. The system of claim 1, wherein the one or more resource templates comprise an operating system image file.

3. The system of claim 2, wherein the new virtual computing resource that is provisioned when updating one or more of the database instances comprises an operating system image file for a different operating system version.

4. The system of claim 1, wherein the new database instance in the new virtual computing resource comprises a database instance for a different version of the database.

5. The system of claim 1, wherein integrating the database instances and the virtual computing resources in the cloud computing environment with an identity authentication service further comprises:

coupling the database instances and the virtual computing resources to the identity authentication service such that authentication of requests to access the database instances and the virtual computing resources is performed by the identity authentication service.

6. The system of claim 1, wherein the second virtual computing resource is located at a different physical location than the first virtual computing resource.

7. The system of claim 6, wherein the database instance in the first virtual computing resource is an active database and the database instances in each of the second virtual computing resource, the third virtual computing resource, and the fourth virtual computing resource are standby databases.

8. The system of claim 6, wherein the database instance in the first virtual computing resource is a read-and-write database and the database instance in each of the second virtual computing resource, the third virtual computing resource, and the fourth virtual computing resource are read-only databases.

9. The system of claim 1, wherein monitoring each of the plurality of virtual computing resources using a monitoring service provided by a second remote computing resource comprises:

establishing a connection between the virtual computing resources in the cloud computing environment and the second computing resource of the server computing device; and receiving, by the second computing resource of the server computing device, one or more alert messages from one or more of the virtual computing resources via the established connection when a failure event occurs at the one or more virtual computing resources.

10. The system of claim 9, wherein the second computing resource of the server computing device determines another virtual computing resource that is available and redirects network traffic intended for the failed virtual computing resources to the another virtual computing resource.

11. The system of claim 1, wherein configuring the database instances in the virtual computing resources to synchronize data between the database instances comprises:

establishing synchronous data transfer from the database instance in the first virtual computing resource to a data migration hub in the first availability zone, establishing synchronous data transfer from the data migration hub in the first availability zone to each of:

i) the database resource in the second virtual computing resource and ii) a data migration hub in the second availability zone; and establishing asynchronous data transfer from the data migration hub in the second availability zone to each of: i) the database resource in the third virtual computing resource and ii) the database resource in the fourth virtual computing resource.

12. A computerized method of automatically provisioning and managing secure database resources in a cloud computing environment, the method comprising:

provisioning, by a server computing device, a plurality of virtual computing resources in the cloud computing environment using one or more resource templates, including provisioning a first virtual computing resource and a second virtual computing resource in a first availability zone of the cloud computing environment and provisioning a third virtual computing resource and a fourth virtual computing resource in a second availability zone of the cloud computing environment;

creating, by the server computing device, a database instance in each of the virtual computing resources, including attaching each of the database instances to a physical disk drive;

integrating, by the server computing device, the database instances and the virtual computing resources in the cloud computing environment with an identity authentication service provided by a first computing resource of the server computing device, including:
  establishing a connection between the virtual computing resources in the cloud computing environment and the first computing resource of the server computing device,
  linking each of a plurality of users of the identity authentication service to corresponding user representations in the cloud computing environment that are maintained by a cloud service provider,
  authenticating database access requests received by the database instances and the virtual computing resources from end user devices based upon the user representations in the cloud computing environment, and
  when access changes are made to users of the identity authentication service, automatically synchronizing the access changes to the corresponding user representations in the cloud computing environment;

configuring, by the server computing device, the database instances in the virtual computing resources to synchronize data between the database instances, including:
  establishing synchronous data transfer from the database instance in the first virtual computing resource to the database instance in the second virtual computing resource,
  establishing synchronous data transfer from the database instance in the third virtual computing resource to the database instance in the fourth virtual computing resource, and
  establishing asynchronous data transfer from the database instance in the first virtual computing resource to the database instance in the third virtual computing resource;

monitoring, by the server computing device, each of the plurality of virtual computing resources using a monitoring service provided by a second computing resource of the server computing device, including determining that one of the virtual computing resources has failed and redirecting network traffic from the failed virtual computing resources to another one of the plurality of virtual computing resources; and updating, by the server computing device, one or more of the database instances by detaching the associated physical disk drive from the database instance, deleting the virtual computing resource that contains the database instance, provisioning a new virtual computing resource using a different resource template, creating a new database instance in the new virtual computing resource, and re-attaching the physical disk drive to the new database instance.

13. The method of claim 12, wherein the one or more resource templates comprise an operating system image file.

14. The method of claim 13, wherein the new virtual computing resource that is provisioned when updating one or more of the database instances comprises an operating system image file for a different operating system version.

15. The method of claim 12, wherein the new database instance in the new virtual computing resource comprises a database instance for a different version of the database.

16. The method of claim 12, wherein integrating the database instances and the virtual computing resources in the cloud computing environment with an identity authentication service further comprises:
  coupling the database instances and the virtual computing resources to the identity authentication service such that authentication of requests to access the database instances and the virtual computing resources is performed by the identity authentication service.

17. The method of claim 12, wherein the second virtual computing resource is located at a different physical location than the first virtual computing resource.

18. The method of claim 17, wherein the database instance in the first virtual computing resource is an active database and the database instance in each of the second virtual computing resource, the third virtual computing resource, and the fourth virtual computing resource are standby databases.

19. The method of claim 17, wherein the database instance in the first virtual computing resource is a read-and-write database and the database instance in each of the second virtual computing resource, the third virtual computing resource, and the fourth virtual computing resource are read-only databases.

20. The method of claim 12, wherein monitoring each of the plurality of virtual computing resources using a monitoring service provided by a second remote computing resource comprises:
  establishing a connection between the virtual computing resources in the cloud computing environment and the second computing resource of the server computing device; and
  receiving, by the second computing resource of the server computing device, one or more alert messages from one or more of the virtual computing resources via the established connection when a failure event occurs at the one or more virtual computing resources.

21. The method of claim 20, wherein the second computing resource of the server computing device determines another virtual computing resource that is available and redirects network traffic intended for the failed virtual computing resources to the another virtual computing resource.

22. The method of claim 12, wherein configuring the database instances in the virtual computing resources to synchronize data between the database instances comprises:

establishing synchronous data transfer from the database instance in the first virtual computing resource to a data migration hub in the first availability zone, establishing synchronous data transfer from the data migration hub in the first availability zone to each of: i) the database resource in the second virtual computing resource and ii) a data migration hub in the second availability zone; and establishing asynchronous data transfer from the data migration hub in the second availability zone to each of: i) the database resource in the third virtual computing resource and ii) the database resource in the fourth virtual computing resource.

* * * * *